(12) United States Patent
Song et al.

(10) Patent No.: US 9,873,200 B2
(45) Date of Patent: Jan. 23, 2018

(54) PERSONAL ROBOT

(71) Applicant: FUTURE ROBOT CO., LTD., Seongnam-si, Gyeonggi-do (KR)

(72) Inventors: Se Kyong Song, Seongnam-si (KR); Sang Ki Lee, Seongnam-si (KR)

(73) Assignee: FUTURE ROBOT CO., LTD., Seongnam-si, Gyeonggi-Do (KR)

( * ) Notice: Subject to any disclaimer, the term of this patent is extended or adjusted under 35 U.S.C. 154(b) by 221 days.

(21) Appl. No.: 14/758,200

(22) PCT Filed: Aug. 28, 2013

(86) PCT No.: PCT/KR2013/007740
§ 371 (c)(1),
(2) Date: Jun. 26, 2015

(87) PCT Pub. No.: WO2014/104531
PCT Pub. Date: Jul. 3, 2014

(65) Prior Publication Data
US 2015/0336276 A1   Nov. 26, 2015

(30) Foreign Application Priority Data
Dec. 28, 2012   (KR) .......................... 10-2012-0156738

(51) Int. Cl.
*B25J 13/00*   (2006.01)
*B25J 9/00*   (2006.01)
(Continued)

(52) U.S. Cl.
CPC .............. *B25J 13/00* (2013.01); *A63H 11/00* (2013.01); *A63H 30/04* (2013.01); *B25J 9/0003* (2013.01);
(Continued)

(58) Field of Classification Search
CPC ........ B25J 13/00; B25J 9/0003; B25J 9/1666; B25J 9/1694; B25J 11/001; B25J 13/006;
(Continued)

(56) References Cited

U.S. PATENT DOCUMENTS

2005/0287038 A1* 12/2005 Dubrovsky .......... G05B 19/409
422/63
2007/0192910 A1* 8/2007 Vu ........................... B25J 5/007
700/245
(Continued)

FOREIGN PATENT DOCUMENTS

KR   10-2006-0079832 A   7/2006
KR     10-0750633 B1     8/2007
(Continued)

OTHER PUBLICATIONS

Search Report for International Application No. PCT/KR2013/007740.

*Primary Examiner* — Nicholas Kiswanto
(74) *Attorney, Agent, or Firm* — LRK Patent Law Firm (57) ABSTRACT

A personal robot including a first smart device, a robot main body, and a second smart device is implemented as a first type where the first smart device is wirelessly connected to the robot main body, as a second type where the first smart device is mounted on and connected to the robot main body in a wired manner, or as a third type where the second smart device is wirelessly connected to the robot main body where the first smart device is mounted on and connected to the robot main body in a wired manner. In the third type, the robot main body is connected to the first smart device in a wired manner and wirelessly connected to the second smart device, and a robot main body control unit controls the robot main body according to simultaneously processed data from the first and second smart devices.

6 Claims, 5 Drawing Sheets

(51) Int. Cl.
  *B25J 13/08* (2006.01)
  *B25J 9/16* (2006.01)
  *B25J 11/00* (2006.01)
  *A63H 30/04* (2006.01)
  *A63H 11/00* (2006.01)
  *H04M 1/04* (2006.01)
  *H04M 1/725* (2006.01)

(52) U.S. Cl.
  CPC ............ *B25J 9/1666* (2013.01); *B25J 9/1694* (2013.01); *B25J 11/001* (2013.01); *B25J 13/006* (2013.01); *B25J 13/081* (2013.01); *B25J 13/088* (2013.01); *H04M 1/04* (2013.01); *H04M 1/72533* (2013.01); *Y10S 901/01* (2013.01)

(58) Field of Classification Search
  CPC ....... B25J 13/081; B25J 13/088; A63H 11/00; A63H 30/04
  See application file for complete search history.

(56) References Cited

U.S. PATENT DOCUMENTS

| | | | |
|---|---|---|---|
| 2008/0172146 A1* | 7/2008 | Lin | G05D 1/021 700/245 |
| 2010/0279736 A1* | 11/2010 | Ruotolo | G06F 17/5095 455/557 |
| 2012/0290111 A1* | 11/2012 | Badavne | A63H 3/28 700/94 |
| 2014/0277847 A1* | 9/2014 | Cann | B25J 5/007 701/2 |
| 2015/0142252 A1* | 5/2015 | Hutson | B25J 5/00 701/28 |
| 2017/0080558 A1* | 3/2017 | Cann | B25J 5/007 |

FOREIGN PATENT DOCUMENTS

| KR | 10-2009-0103078 A | 10/2009 |
|---|---|---|
| KR | 10-2012-0129230 A | 11/2012 |

* cited by examiner

PERSONAL ROBOT

TECHNICAL FIELD

The present invention relates to a personal robot, and more specifically, to a personal robot which can be implemented with a reduced number of components at a low cost by utilizing resources of a portable smart device.

BACKGROUND ART

A robot is a machine having a shape and functions similar to those of a human being or a machine having an ability of working on something by itself. A robot using an artificial power sometimes works in place of or together with a human being. Generally, a robot is designed to do a work planned by a manufacturer and does a lot of work performed by human beings on behalf of the human beings.

An automated robot performing assembly, welding, handling or the like in a manufacturing factory is referred to as an industrial robot, and a robot having a function of recognizing an environment and making a decision by itself is referred to as an intelligent robot.

A lot of robots are used even at home to help housework. For example, various kinds of products of robot vacuum cleaners are already commercialized, and prices of the products are considerably lowered. Recently, as the value of mental experience such as emotion or communion is emphasized socially, a technique of emotional approach method, as well as increase in the physical accuracy and force, is introduced even in the field of robot. A product introduced in accordance with this trend is a personal robot.

Unlike the industrial robot, the personal robot is a robot targeting an individual to provide a variety of services at home, a medical institution, a general facility or the like. However, a conventional personal robot needs a large number of components such as a driving apparatus, various output devices, various sensors and the like in order to perform a function such as a drive for running, display, recognition of an image, a motion or a voice or the like, and it is difficult to implement the personal robot since controlling the robot is complicated. Particularly, there is a problem in that it is difficult for a general consumer to purchase or use a personal robot since the price thereof increases as the personal robot performs more functions, and thus practicability of the personal robot is lowered.

On the other hand, as a portable smart device such as a smart phone, a smart tablet, a tablet PC or the like secures a position as a necessity of life, interest in harmoniously using such a portable smart device together with a robot is generated.

DISCLOSURE OF INVENTION

Technical Problem

Therefore, the present invention has been made in view of the above problems, and it is an object of the present invention to provide a personal robot which can be implemented with a reduced number of components at a low cost and allows a user to stably and conveniently control the robot by utilizing resources of a general portable smart device, such as a device, a sensor and the like having a display or various recognition functions.

Technical Solution

To accomplish the above object, according to one aspect of the present invention, there is provided a Personal robot including: first and second smart devices 110 and 310 respectively including: a display unit 111 or 311 for displaying information, a near field wireless communication unit 117 or 317 for performing near field wireless communication, a touch screen 113 or 313 for inputting information, a connection unit 119 or 319 for electrically connecting to and exchanging signals with other devices, and a control unit 118 or 318 for controlling operation; and a robot main body 200 including: a smart device mounting unit 221 placed on a front surface to mount the first smart device 110, a wired and wireless communication unit 210 for performing wired and wireless communication with the first and second smart devices 110 and 310, an emotion expression unit 227 for generating an output signal of a form which can be recognized by a user, a sensor unit 222 for sensing movement of an external object or the user, a driving unit 232 for running the robot main body, and a robot control unit 235 for controlling operation of the robot main body, wherein the robot main body 200 is selectably connected to the first or second smart device 110 or 310 in a wired or wireless manner, and when the robot main body 200 is wiredly connected to the first smart device 110 and wirelessly connected to the second smart device 310, the robot main body control unit 235 simultaneously processes data received from the first and second smart devices 110 and 310 and controls operation of the robot main body according to the processing.

The wired and wireless communication unit 210 determines whether a source of the transmitted and received data is wired or wireless, and the robot control unit 235 may include: a data processing unit 260 for analyzing data received through the wired and wireless communication unit 210 or data to be transmitted through the wired and wireless communication unit 210 and including an input data processing unit 262 for processing the received data and an output data processing unit 264 for processing the data to be transmitted; and a robot service processing unit 270 for transmitting a control signal for controlling operation of the robot main body according to a result of analyzing the data performed through the data processing unit 260.

The robot control unit 235 may further include an additional function extension unit 278 installed in a motherboard, in which the robot control unit is implemented, to have a plug-in structure for extension of an additional function.

The connection unit 119 of the first smart device 110 is a USB port, and the wired and wireless communication unit 210 of the robot main body 200 may include a USB cable 239 connected to the USB connection port of the first smart device 110.

A USB cable penetration hole 242 for passing the USB cable 239 is formed at a circumferential edge of the smart device mounting unit 221 of the robot main body 200, and an edge cover 241 is detachably combined at the circumferential edge of the smart device mounting unit 221.

The emotion expression unit 227 may include a speaker 228 for outputting a sound, a lamp 229 for generating light, and a motion unit 231 for moving a Predetermined portion of the robot main body 200.

The sensor unit 222 may include an obstacle detecting sensor 225 installed on a front surface and a rear surface of the robot main body 200 to sense objects placed in front of and behind the robot main body 200, a fall prevention sensor 224 installed on a bottom surface of the robot main body 200 to sense an object placed under the robot main body 200, and a touch sensor 226 installed in the robot main body 200 to sense a predetermined stimulus.

The robot main body 200 further includes a beam project module 280 for performing a beam project function, and when an HDMI cable connected to the robot control unit 235 is connected to an HDMI terminal formed in the first smart device 110, the robot main body 200 receives an image and a voice of the first smart device through the HDMI cable and operates the beam project module.

Advantageous Effects

Since the personal robot according to the present invention wiredly or wirelessly connects a portable smart device possessed by an individual to the robot main body and stably utilizes resources of the portable smart device, various functions such as a display function and the like that can be provided by the smart device can be excluded from the robot main body, and thus it has an effect of providing various services to a user while reducing the number of components and manufacturing cost of the robot main body. In addition, since the robot main body may be wirelessly connected to and exchange data with a smart device other than the smart device mounted on the robot main body, the user may control the robot main body through a separate smart device other than the smart device mounted on the robot main body, and thus it has an effect of improving convenience of the user.

In addition, since an additional function extension unit having a plug-in structure is installed in the robot main body, it has an effect of extending performance without a burden of additional cost when a function of the robot main body is improved or added in the future.

In addition, since the USB cable is not exposed outside when the smart device is wiredly connected to the robot main body through the USB cable, the robot has a good sense of beauty in appearance, and since the smart device is integrated with the robot main body, it has an effect of solving the problem of the robot being caught on an obstacle or the like while moving.

DESCRIPTION OF SYMBOLS 110, 310: First, Second smart device
111, 311: Display unit
112, 312: Posture control sensor
117, 317: Near field wireless communication unit
119, 319: Connection unit
118, 318: Control unit
200: Robot main body
210: Wired and wireless communication unit
221: Smart device mounting unit
222: Sensor unit
225: Obstacle detecting sensor
227: Emotion expression unit
232: Driving unit
235: Robot control unit
241: Edge cover
260: Data processing unit
270: Robot service processing unit
278: Additional function extension unit
280: Beam project module

BEST MODE FOR CARRYING OUT THE INVENTION

Hereafter, a personal robot according to the Present invention will be described in detail with reference to the accompanying drawings.

In describing the present invention, the size and shape of the components shown in the drawings may appear exaggerated or simplified for clarity and convenience of description. In addition, the terms specially defined considering the configuration and operation of the present invention may vary depending on the intention or practices of a user or operator. These terms should be interpreted as a meaning and a concept corresponding to the technical spirits of the present invention based on the contents throughout the specification.

Figure 1:
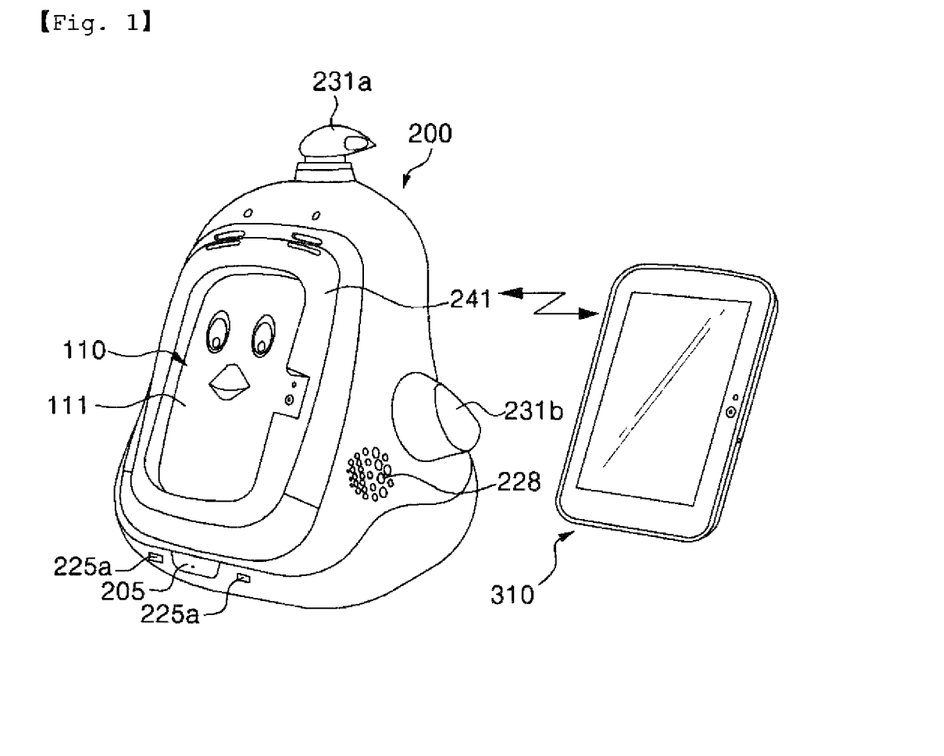
FIG. 1 is a view showing the configuration of a personal robot according to an embodiment of the present invention.
Figure 2:
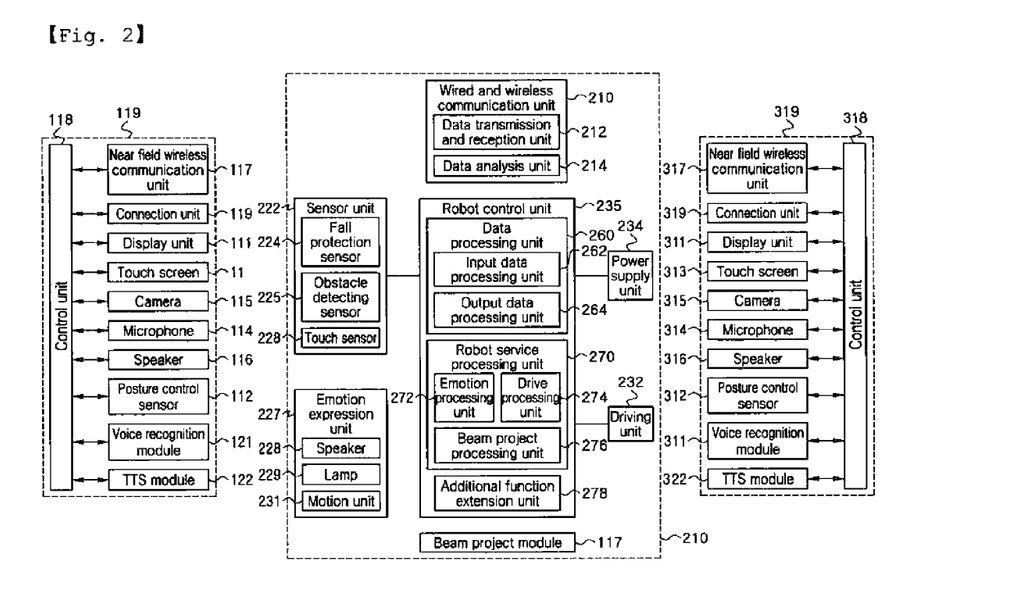
FIG. 2 is a block diagram showing major configuration of a personal robot according to an embodiment of the present invention.
Figure 3:
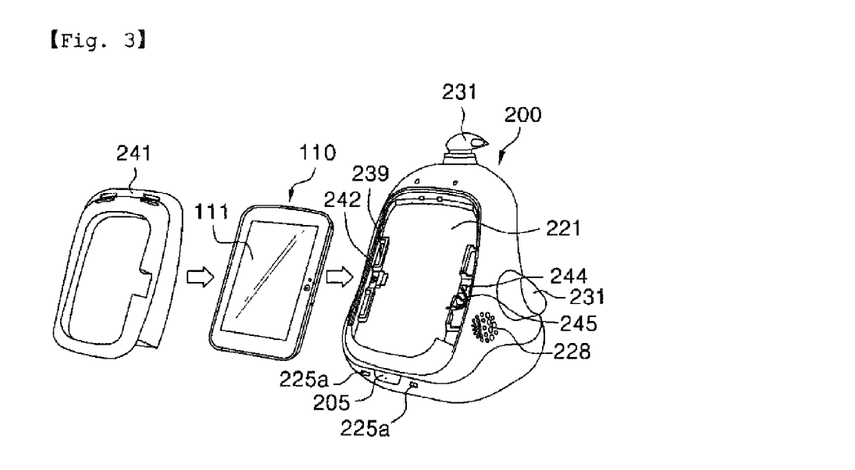
FIG. 3 is a perspective view showing a state of separating a first smart device and an edge cover from a robot main body of a personal robot according to an embodiment of the present invention.

FIG. 1 is a view showing the configuration of a personal robot according to an embodiment of the present invention, and FIG. 2 is a block diagram showing the major configuration of a personal robot according to an embodiment of the present invention.

As shown in FIGS. 1 and 2, a personal robot according to an embodiment of the present invention includes first and second portable smart devices 110 and 310 and a robot main body 200. The first smart device 110 and the second smart device 310 are wiredly or wirelessly connected to the robot main body 200, and the personal robot according to the present invention performs various functions. The personal robot according to an embodiment of the present invention operates by wirelessly connecting the first smart device 110 to the robot main body 200. In another embodiment, the personal robot operates by mounting and wiredly connecting the first smart device 110 onto the robot main body 200, and in still another embodiment, the personal robot operates by mounting and wiredly connecting the first smart device 110 onto the robot main body 200 and wirelessly connecting the second smart device 310 to the robot main body 200. Operation in each of the embodiments will be described below.

On the other hand, although it is described that the first smart device 110 is wiredly connected the to the robot main body as an example for the convenience of explanation, the present invention is not limited thereto, and the second smart device 310 can be mounted on the robot main body 200 instead of the first smart device 110. In addition, since the configuration of the first smart device 110 is the same as that of the second smart device 310, only the first smart device 110 will be described hereinafter, and detailed description of the second smart device 310 will be omitted.

Various kinds of devices, such as a smart phone, a smart tablet (pad), a tablet PC and the like, basically having a display function and a variety of communication functions including communication of voices, images and data can be used as the portable smart device 110. The portable smart device 110 includes a display unit 111 for displaying information, a touch screen 113 for input of a user, a near field wireless communication unit 117 for performing near field wireless communication such as Bluetooth, NFC, infrared communication and the like, a microphone 114 for inputting a voice, a camera 115 for photographing an image and inputting image information, a speaker 116 for outputting a sound, a posture control sensor 112 for controlling an external shock, a motion or a posture, a connection unit 119 for performing wired connection and communication with the robot main body 200, and a control unit 118 for controlling general operation of the smart device 110. In addition, a voice recognition module 121 for recognizing a voice input through the microphone 114 and converting and outputting the voice as a text and a text-t speech (TTS) module 122 for converting a text into a voice may be installed in the smart device 110 in the form of a default program or an application. Here, it may be understood that the communication includes both voice communication and data communication. In addition, the smart device 110 may further include a variety of publicized components, such as a GPS receiver for providing position information, a wireless communication unit for performing voice communication and data communication in a wireless manner, a lamp and the like, currently applied to the smart device 110 such as a smart phone, a smart tablet, a tablet PC or the like.

The connection unit 119 is a component for connecting to and communicating with the robot main body 200, and the smart device 110 may communicate with the robot main body 200 by electrically connecting to a wired and wireless communication unit 210 of the robot main body 200 through the connection unit 119. That is, an input signal, a control signal or data input through the smart device 110 can be provided to the robot main body 200 through the connection unit 119 and the wired and wireless communication unit 210, and an input signal or data input through the robot main body 200 can be provided to the smart device 110 also through the wired and wireless communication unit 210 and the connection unit 119. According to an embodiment of the present invention, the connection unit 119 can be implemented as a USB port installed in a general smart device connected to the control unit 118. The connection unit 119 is generally formed at one side on the outer surface of the smart device 110. Before being connected to the robot main body 200, the connection unit 119 performs a function of connecting to another device and supplying power, which is performed by a general smart device.

On the other hand, according to the present invention, the first smart device 110 and the robot main body 200 may perform non-contact near field wireless communication through the near field wireless communication unit 117 and the wired and wireless communication unit 210, as well as wired communication according to electrical connection, and the wireless communication may perform communication of data and control signals, like the wired communication. Various communication methods, e.g., Bluetooth communication, Zigbee communication, infrared ray communication and the like, can be applied as a near field wireless communication method, and since this is a publicized technique, detailed description thereof will be omitted.

The posture control sensor 112 may include at least any one of a gyro-sensor, a geo-magnetic sensor, an accelerometer sensor and a gravity sensor or may be implemented as a motion recognition sensor of a hybrid sensor type integrating the above sensors in one chip, and when the smart device is connected to the robot main body, the posture control sensor 112 provides information needed for posture control of the robot main body.

The control unit 118 controls general operation of the smart device 110 as described above. Meanwhile, one of the characteristics of the present invention is that the control unit 118 of the smart device 110 controls a robot control unit 235 of the robot main body 200. That is, the control unit 118 of the smart device 110 works as a main control unit to control operation of the robot main body 200. To this end, an application for controlling the robot main body can be installed in the smart device 110. When an electrical connection is not established between the smart device 110 and the robot main body 200, the smart device 110 transmits a control signal through the near field wireless communication unit 117, and when the smart device 110 is electrically connected to the robot main body 200, the smart device 110 transmits a control signal through the connection unit 119. Detailed operation of the control unit 118 for controlling the robot main body will be described below.

Referring to FIGS. 2 to 7, the robot main body 200 includes a smart device mounting unit 221 for mounting the first smart device 110, a wired and wireless communication unit 210 for performing wired and wireless communication with the first and second smart devices 110 and 310, a sensor unit 222 provided with a variety of sensors, an emotion expression unit 227 for generating an output signal of a form which can be recognized by a user, a driving unit 232 for driving the robot main body 200, a power supply unit 234, and a robot control unit 235 for controlling general operation of the robot main body 200. Such a robot main body 200 can be formed in a shape of an animal or a familiar character, as well as in the shapes or forms shown in the figures.

The smart device mounting unit 221 is provided on the front surface of the robot main body 200. The smart device mounting unit 221 has a structure dented toward inside so that the smart device 110 may be inserted. A USB cable penetration hole 242 for passing a USB cable 239 is formed at one side of the circumferential edge of the smart device mounting unit 221. In addition, a speaker cable penetration hole 244 for passing a speaker cable 245 is formed at the other side of the circumferential edge of the smart device mounting unit 221. The speaker cable 245 connects the speakers 116 and 228 of the smart device and the robot control unit to each other. On the other hand, although it is not shown in the figures in detail, the smart device mounting unit 221 may have a separate fixing means (e.g., a magnet, a coupling projection and a coupling depression or the like) so that the smart device may be stably implemented.

According to a preferred embodiment of the present invention described above, since the connection unit 119 of the smart device 110 is implemented as a USB port connected to the control unit 118, the wired and wireless communication unit 210 of the robot main body 200 should be connected to the USB port of the smart device. Therefore, according to a preferred embodiment of the present invention, the robot main body 200 is provided with the USB cable 239 connected to the USB port of the smart device to perform wired communication. Accordingly, if the USB cable 239 of the robot main body exposed through the USB cable penetration hole 242 is connected to the USB port (connection unit) 119 of the smart device 110 after the smart device 110 is mounted on the smart device mounting unit 221, the smart device and the robot main body are connected to each other in a wired manner and operate as a personal robot. It can be designed to diversely change the position of the USB cable penetration hole 242, i.e., the position of exposing the USB cable 239, according to the position of the USB port of the smart device.

A structure for wiredly connecting to the USB connection terminal of the smart device is not limited to the manner described above and can be configured in a variety of ways. For example, a separate USB port connected to the robot control unit 235 can be implemented in the robot main body 200, and both USB ports of the smart device and the robot main body can be connected through a separate USB cable. That is, it is a method of forming a USB port at one side on the outer surface of the robot main body and connecting the USB port of the robot main body and the USB port of the smart device to each other using a separate USB cable.

Meanwhile, an edge cover 241 is detachably combined at a position corresponding to the edge unit of the smart device mounting unit 221. Accordingly, the smart device is mounted on the robot main body by separating the edge cover 241 from the robot main body first, inserting the smart device in the smart device mounting unit 221, connecting the USB cable 239 to the USB port (connection unit) of the smart device and combining the edge cover 241. Since the USB cable exposed when the smart device and the robot main body are connected to each other is covered by detachably combining the edge cover 241 as described above and only the display unit 111 of the smart device is exposed as shown in the figure, it is advantageous in that the external view and a sense of beauty can be enhanced. In addition, since the USB cable is not exposed outside, the problem of the USB cable being caught on an obstacle or the like when the robot runs can be solved. On the other hand, although it is not shown in the figures in detail, the robot main body may have a separate fixing means in the edge cover 241 and the edge unit of the smart device mounting unit 221 to stably combine the edge cover 241.

In addition, a power button 205 for inputting on/off of power of the robot main body may be formed below the smart device mounting unit 221.

The wired and wireless communication unit 210 includes a data transmission and reception unit 212 and a data analysis unit 214. Here, the meaning of data can be interpreted as a concept including a control signal as well as data. The data transmission and reception unit 212 performs communication through wired and wireless means, and to this end, it includes a wired communication module and a wireless communication module. According to a preferred embodiment of the present invention, the wired communication module is connected to the USB cable 239 described above. The data analysis unit 214 determines whether a source of data transmitted and received through the data transmission and reception unit 212 is wired or wireless and transmits the data to the robot control unit 235.

Figure 4:
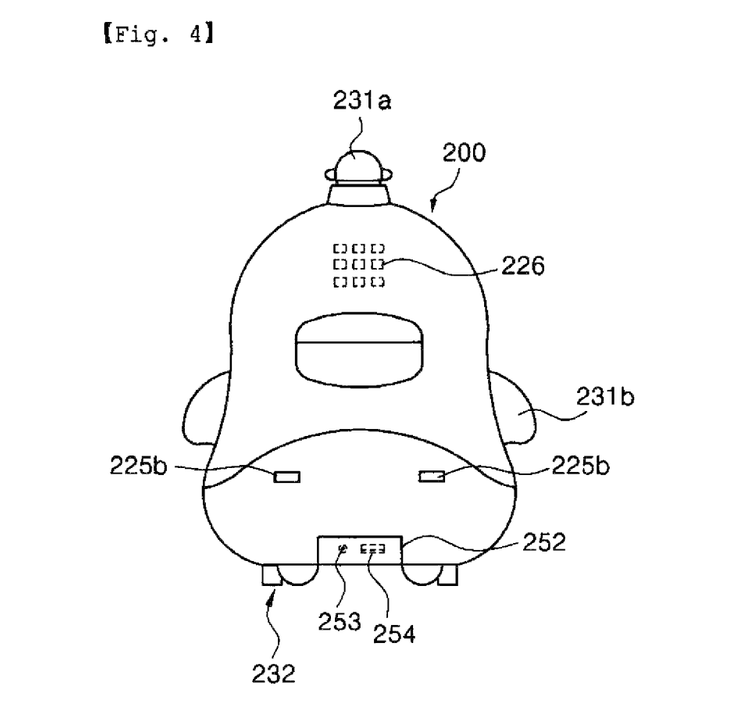
FIG. 4 is a rear view showing a robot main body on which the first smart device of FIG. 1 is mounted.
Figure 5:
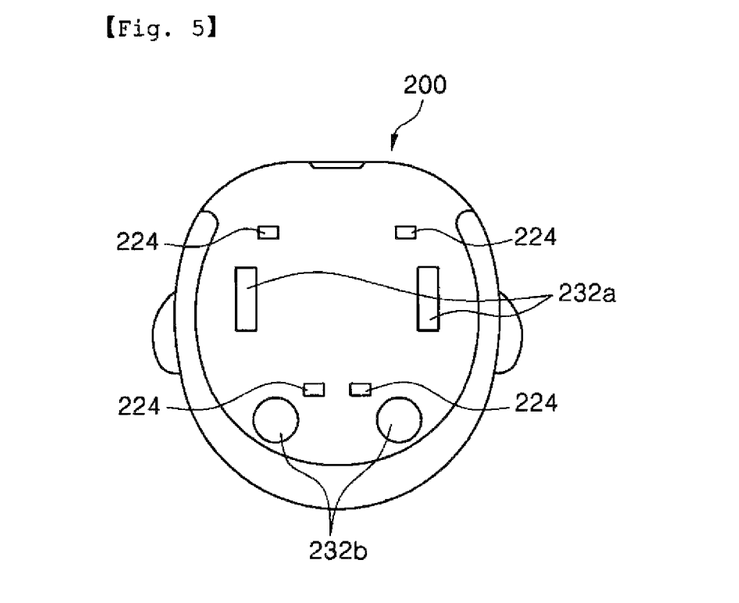
FIG. 5 is a bottom view showing a robot main body on which the first smart device of FIG. 1 is mounted.
Figure 6:
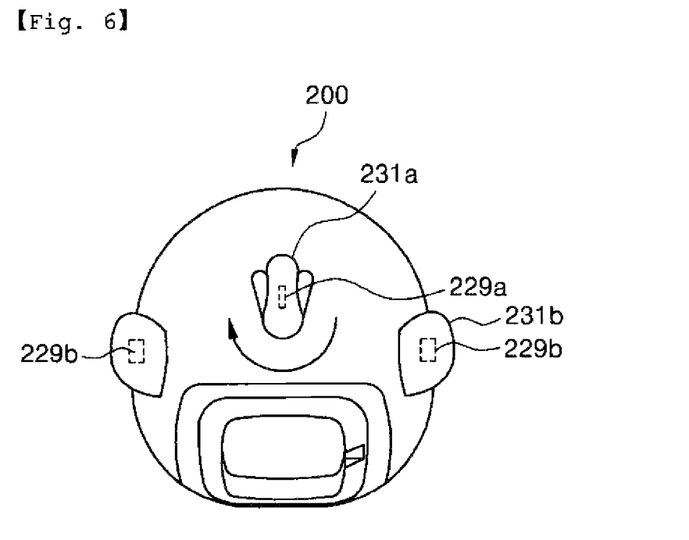
FIGS. 6 and 7 are a plan view and a side view showing operation of an emotion expression unit of a robot main body on which the first smart device is mounted.

The sensor unit 222 provides various kinds of information to the control unit 235 of the robot main body, and, specifically, it includes an obstacle detecting sensor 225, a fall prevention sensor 224 and a touch sensor 226. The obstacle detecting sensor 225 senses objects placed in front of and behind the robot main body 200 and provides the robot control unit 235 with a sensing signal. According to an embodiment of the present invention, the obstacle detecting sensor 225 is installed such that two obstacle detecting sensors 225a are installed on both sides of the power button 205 positioned, at a low portion of the front surface of the robot main body 200 as shown, in FIG. 3 and two obstacle detecting, sensors 225b are installed on both sides at a low portion of the rear surface of the robot main body 200 as shown in FIG. 4. The fall prevention sensor 224 is installed on the bottom surface of the robot main body 200 as shown in FIG. 5 to sense an object placed under the robot main body 200 and provide the robot control unit 235 with a sensing signal. According to an embodiment of the present invention, the fall prevention sensor 224 is installed at four points on the outskirts of the bottom surface of the robot main body. The touch sensor 226 senses various stimuli applied to the robot main body 200 as shown in FIG. 4 and provides the robot control unit 235 with a sensing signal, and according to an embodiment of the present invention, it is installed at an upper portion of the rear surface of the robot main body. Various publicized sensors such as an ultrasonic sensor, an infrared sensor, an optical sensor and the like can be used as the obstacle detecting sensor 225 and the fall prevention sensor 224, and in an embodiment of the present invention, a Position Sensitive Detector (PSD) sensor is applied to precisely sense an object.

The number of various sensors in the sensor unit of the present invention or their installation positions can be changed diversely for the sake of their objects, and the scope of the present invention is not limited to a specific number of sensors or installation positions thereof. However, an optimal number of sensors should be installed in appropriate positions to accomplish the objects of installing the sensors and economic efficiency thereof.

The control unit 118 or 318 of the smart device provided with various kinds of information from various sensors of the sensor unit 222 through the robot control unit 235 may communicate with a user or provide the user with information of an emotional form by integrating and analyzing the information provided from the sensors and information obtained from the components installed in the smart device 110 and generating an output signal of a form which can be recognized by a user through the display unit 111 or the emotion expression unit 227 of the robot main body. In addition, the control unit may allow the robot main body 200 to move by controlling the driving unit 232 based on the analyzed information.

On the other hand, referring to FIG. 4, a detachably combined rear side cover 252 is installed at lower portion of the rear surface of the robot main body 200, and a power port 253 for supplying power to the robot main body and a connection terminal 254 such as a USB port for connecting the robot main body to another device are installed in an inner space which appears when the rear side cover 252 is open. The connection terminal is a component for connecting the robot main body to a device other than the smart device. The power supply unit 234 may supply power to the smart device through the USB cable under the control of the robot control unit 235 when a request signal indicating that the smart device needs power is received from the smart device, in addition to performing a function of supplying power to the robot main body.

Figure 7:
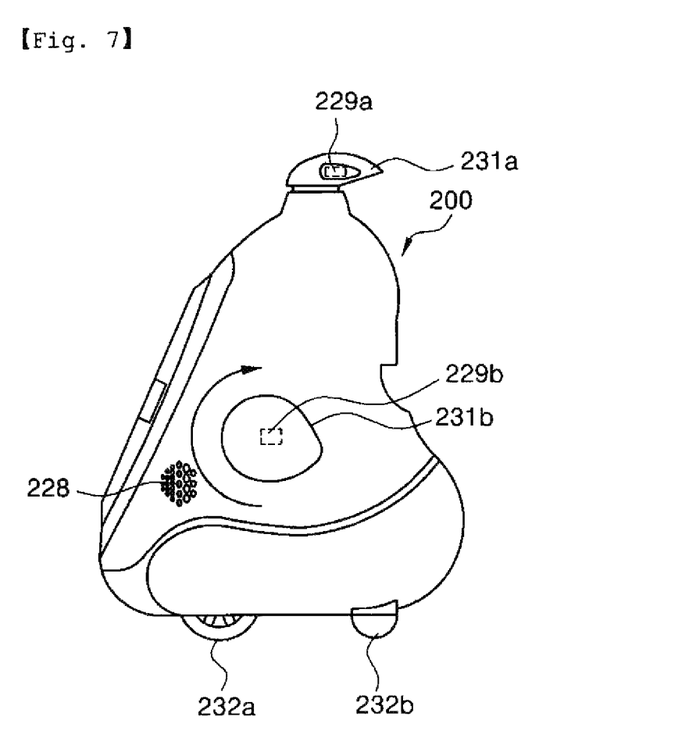
Figure 8:
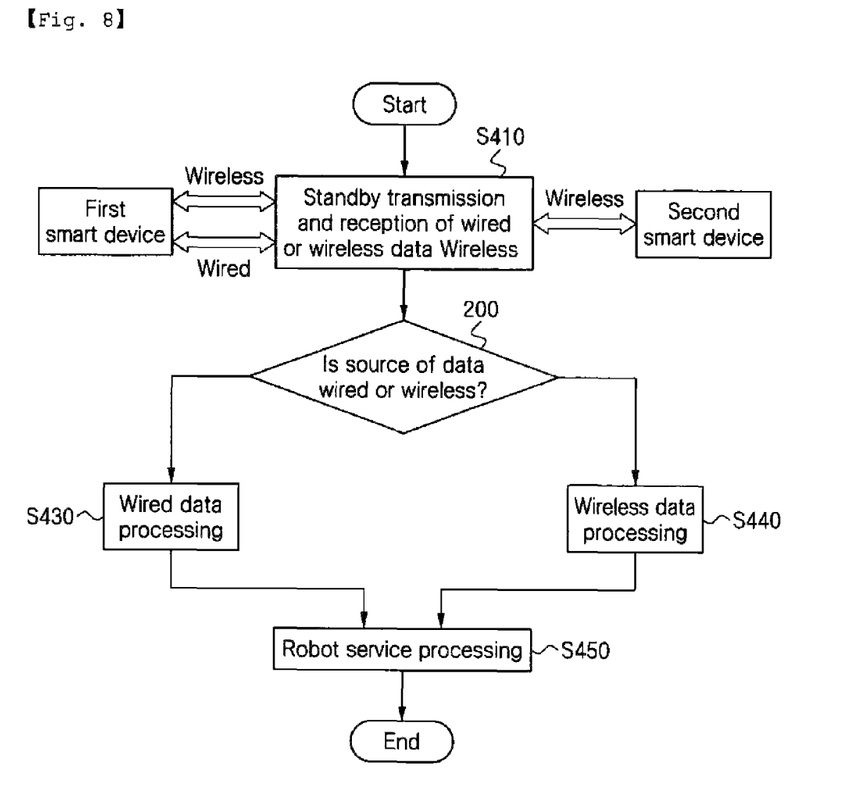
FIG. 8 is a flowchart illustrating operation of a personal robot according to an embodiment of the present invention.

The emotion expression unit 227 is a component for generating various forms of output signals which can be recognized by a user and includes a speaker 228 for outputting a sound, a lamp 229 for generating light, and a motion unit 231 allowing a predetermined portion of the robot main body to have a motion. Although the motion unit 231 includes a first motion unit 231a positioned on the top of the robot main body to have a shape of a head and a second motion unit 231b positioned on both sides of the robot main body to have a shape of an arm or a wing, the present invention is not limited thereto, and the motion unit 231 may be installed on the outer surface of the robot main body 200 to express various mechanical movements. As shown in FIGS. 7 and 8, the motion unit 231 is combined with a servo motor or the like installed inside the robot main body, which is not shown in the figure, so as to rotatably move at a predetermined angle, i.e., 180°. Meanwhile, the lamp 229 is installed inside the motion unit 231, and since lamps 229a and 229b are installed inside the motion units 231a and 231b to emit light at the very moment when the motion unit operates, visual expression can be maximized for the user.

The emotion expression unit 227 works as a means for expressing emotion of a robot, and the robot control unit 235 may sensibly provide a user with information on an emotional state of the robot, allow the robot main body 200 to respond to an external stimulus or movement of the user, and allow emotional communion and communication between the user and the robot in the end by generating various sound effects such as a voice of an emotional expression, a sound of an animal and the like through the speaker 228, lighting or blinking the lamp 229, or moving a predetermined portion of the robot main body through the motion unit 231.

The driving unit 232 includes a front wheel 232a and a rear wheel 232b arranged on the bottom surface of the robot main body 200 as shown in FIG. 5 and includes a driving motor, an encoder and the like, which are not shown in the figure, to drive and control the wheels. The driving unit 232 may be provided in the robot main body 200 in a variety of forms which can move the robot main body 200. For example, the driving unit 232 may be configured in a structure for driving the robot main body 200 by providing a caterpillar or various forms of legs instead of the wheels 232.

On the other hand, according to an embodiment of the present invention, a beam project module 280 may be further installed in the robot main body 200. The beam project module 280 is provided with a lens configuring a beam project, a liquid crystal screen which is seen by passing light, a beam lamp for casting beams and the like. When the beam project module 280 is installed, an HDMI cable for transferring images and voices is connected to the control unit in a manner the same as that of the USB cable 239, and this HDMI cable is connected to an HDMI terminal formed in the smart device. Accordingly, images and voices of the smart device are transmitted to the robot main body, and the robot main body may operate the beam project through the beam project module. The robot control unit 235 may allow a beam project function to be performed immediately when the HDMI cable is connected to the HDMI terminal of the smart device, or a separate operation button or the like for allowing the beam project function to be performed can be installed in the robot main body 200 so that the beam project function may be performed by an input signal according to operation of the operation button.

The robot control unit 235 includes a data processing unit 260, a robot service processing unit 270 and an additional function extension unit 278.

The data processing unit 260 analyzes data received through the wired and wireless communication unit 210 or data to be transmitted through the wired and wireless communication unit 210 and includes an input data processing unit 262 for processing the received data and an output data processing unit 264 for processing the data to be transmitted.

The robot service processing unit 270 transmits a control signal for operating various components of the robot main body according to a result of analyzing the data performed through the data processing unit 260, and, specifically, it includes an emotional expression processing unit 272 for driving the emotion expression unit 227, a drive processing unit 274 for driving the driving unit 232, and a beam project processing unit 276 for driving the beam project module 280.

When hardware of the robot main body additionally needs a function other than the basic functions (drive control, sensor input and output control and the like), the additional function extension unit 278 performs a plug-in function for extending a function in the motherboard in which the robot control unit is implemented. Such a function extension allows a function to be added in a structure such as a Controller Area Network (CAN). Owing to the additional function extension unit having such a plug-in structure, performance can be enhanced without the burden of additional cost when a function of the robot main body is improved or added in the future.

The robot control unit 235 controls operation of the robot depending on the data and control signal received from the first smart device 110 and the second smart device 310 according to an embodiment implementing the present invention. That is, as shown in FIG. 8, the wired and wireless communication unit 210 waits for a wired or wireless signal from the smart device 110 or 310 S410, and if a signal is received, the wired and wireless communication unit 210 analyzes whether the source of the data is wired or wireless and sends the data to the robot control unit 235 S200, and the robot control unit 235 receiving the data processes the wired or wireless data or the control signal S430 or S440 and controls operation of the robot main body 200 so that the robot main body may provide a service for each motion according to a result of processing the data.

Accordingly, when the first smart device 110 is not mounted on the robot main body 200 and wirelessly connected to the robot main body 200, the robot control unit 235 controls operation of the robot main body 200 according to the data or control signal of the first smart device 110 received through wireless communication. In addition, when the first smart device 110 is mounted on and wiredly connected to the robot main body 200, the robot control unit 235 controls operation of the robot main body 200 according to the data or control signal of the first smart device 110 received through wired communication.

On the other hand, when the first smart device 110 is mounted on and wiredly connected to the robot main body 200 and the second smart device 310 is wirelessly connected to the robot main body 200, the robot control unit 235 simultaneously processes wired and wireless signals received from the first smart device 110 and the second smart device 310. Here, simultaneously processing the wired and wireless signals does not mean that the signals are processed simultaneously on the basis of time, but may be interpreted as processing both the wired and wireless signals. On the other hand, if the first smart device 110 is mounted on and wiredly connected to the robot main body 200, the robot main body 200 communicates with the first smart device 110 only through wired communication and does not perform wireless communication. That is, when the first smart device 110 is mounted on the robot main body 200 and the first smart device 110 is wiredly connected to the robot main body 200, the robot main body 200 and the first smart device perform only wired communication, and the robot main body 200 performs wireless communication with the second smart device 310.

One of the characteristics of a robot is having a driving function, and if a smart device is mounted on the robot main body and the robot main body runs, there is a problem in that a user should operate the robot main body following around the robot main body. That is, the smart device transmits a control signal to the robot main body based on the information input from the user through various interfaces, and the robot control unit receives the control signal and controls operation of the robot main body, and it is inconvenient in that when the robot main body on which the smart device is mounted runs, the user should input information through an interface following around the running robot main body. However, according to the present invention, it is advantageous in that it is possible to input information into the robot main body through a separate smart device other than the smart device mounted on the robot main body.

Hereinafter, operation of a personal robot according to the present invention having such a structure will be described.

Embodiment 1—When the First Smart Device 110 is Wirelessly Connected to the Robot Main Body 200

First, when the first smart device 110 is not mounted on the robot main body 200, a user may control the robot main body 200 using the smart device 110 through near field wireless communication. That is, the control unit 118 of the first smart device 110 controls operation of the robot main body by transmitting data or a control command input through various interfaces of the smart device to the robot main body 200, and the robot main body at this point performs only a comparatively simple motion. For example, the control unit 118 controls the robot main body to express a sound stored in the smart device 110 or the robot main body 200 through the speaker 228, to emit light of a certain stored form through the lamp 229, or to move the head, an arm (or wing) or the like through the motion unit 231. The emotion expression unit 227 like this is a component for expressing a state of emotion or feeling of the robot main body 200 and may create various expression techniques appropriate to a situation. In addition, the control unit 118 may control the robot main body 200 to make a simply drive using the first smart device 110.

Embodiment 2—When the First Smart Device 110 is Mounted on the Robot Main Body 200

A complete operation of the robot main body 200 is performed when the first smart device 110 is mounted on the robot main body 200 and connected in a wired manner. That is, the control unit 118 receives various kinds of information from the components of the robot main body 200, as well as from the components of the first smart device 110, and controls operation of the robot main body 200 as well as the first smart device 110 using the received information to perform a function appropriate to a situation. Specifically, the control unit 118 of the first smart device 110 transmits a control signal to the robot control unit 235 using a user command and various kinds of information input through various interfaces such as the touch screen 113, the microphone 114, the camera 115, the posture control sensor 112 and the like basically provided in the smart device, or if a detection signal detected by the sensor unit 222 of the robot main body 200 is provided, the control unit 118 transmits a control signal to the robot control unit 235 again using the detection signal. In addition, the robot control unit 235 controls general operation of the robot main body 200, such as operation of the emotion expression unit 227, the driving unit 232, power supply unit 234 and the beam project module 280, according to the data and control signal input from the first smart device.

For example, the control unit 118 of the smart device acquires position information or recognizes visual information such as a facial expression, a motion or the like of a user through the camera 115 of the smart device, recognizes a voice from the user through the microphone 114 of the smart device and recognizes a sense of touch from the user through the touch sensor 226 of the robot main body 200. In order to recognize an emotional state, feeling or the like of the user through the recognition information and express an emotion of the robot corresponding thereto, an icon or an image having a face of various shapes (of a human being, an animal, a character or the like) such as changing the shape of a mouth or the facial expression is expressed on the display unit 111 of the smart device 110, or a word, a sound or the like expressing various feeling states is provided to the user or a conversation is induced through the speaker 228, or various user interfaces (UIs) for performing functions of the robot main body as well as the smart device can be provided to the user, and thus the robot may perform a function such as communication, emotional communion or the like with the user. In addition, the control unit 118 allows the lamp 229 and the motion unit 231 of the robot main body 200 to perform various corresponding emotional expressions.

In addition, if the smart device 110 is combined with the robot main body 200, the control unit 118 controls driving of the robot main body so that the robot main body may stably run. That is, the control unit 118 of the smart device recognizes an obstacle and prevention of fall through the obstacle detecting sensor 225 and the fall prevention sensor 224 of the robot main body and, in addition, controls posture of the robot main body using the information received from the posture control sensor 112 installed in the smart device so that the robot may stably run in the end. Specifically, the control unit 118 provided with image information from the camera 124 may perform a function of recognizing a position from the image information, controls the robot main body 200 to run avoiding the obstacle by analyzing sensing information received from the obstacle detecting sensor 225 and the fall prevention sensor 224, and controls posture of the robot main body 200 based on the information received from the posture control sensor 112.

Embodiment 3—When the First Smart Device 110 is Mounted on and Wiredly Connected to the Robot Main Body 200 and, in Addition, the Second Smart Device 310 is Wirelessly Connected to the Robot Main Body 200

The first smart device 110 and the robot main body 200 perform functions the same as those of embodiment 2 described above. However, if the smart device 110 is mounted on the robot main body 200 and the robot main body runs, it is inconvenient in that a user should input information through an interface of the smart device following around the running robot main body 200 on which the smart device 110 is mounted. However, according to the present invention, since the second smart device 310 can be implemented to perform a function almost the same as that of the first smart device 110, i.e., the second smart device 310 is implemented to transmit and receive various kinds of data and control signals to and from the robot main body 200 through wireless communication, the user may control the robot main body 200 on which the first smart device 110 is mounted using the second smart device 310 and, in addition, perform various functions such as a motion, an emotional expression, a conversation, an act of running and the like in response to a request or a state of a user. Meanwhile, although it is described, for example, that only one smart device 310 wirelessly communicates with the robot main body for the convenience of explanation, the present invention is not limited thereto, and a plurality of other smart devices not mounted on the robot main body may control the robot main body by performing wireless communication with the robot main body.

As described above, since the personal robot according to an embodiment of the present invention mounts and wiredly or wirelessly connects a portable smart device possessed by an individual to the robot main body and utilizes the components essentially embedded in the portable smart device, it may provide faithful emotional communion and communication with a user while reducing the number of components and manufacturing cost of the robot main body 200 and has an advantage of providing various services to the user according thereto. In addition, since the robot main body may be wirelessly connected to and exchange data with a smart device other than the smart device mounted on the robot main body, the user may control the robot main body through a separate smart device other than the smart device mounted on the robot main body, and thus it has an advantage of improving convenience of the user. In addition, since an additional function extension unit having a plug-in structure is installed in the robot main body, it has an advantage of extending performance without a burden of additional cost when a function of the robot main body is improved or added in the future. In addition, since the USB cable is not exposed outside when the smart device is wiredly connected to the robot main body through the USB cable, the robot has a good sense of beauty in appearance, and since the smart device is integrated with the robot main body, it has an advantage of solving the problem of the robot being caught on an obstacle or the like while moving.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A personal robot comprising:
   first and second smart devices (110 and 310) each including:
      a display (111 or 311) which displays information;
      a near field wireless communicator (117 or 317) which performs near field wireless communication;
      a touch screen (113 or 313) which inputs information;
      a connector (119 or 319) which electrically connects to and exchanges signals with other devices;
      a posture control sensor (112) which provides information for controlling a posture of a robot main body (200); and
      a controller (118 or 318) which controls operation; and
   the robot main body (200) including:
      a smart device mount (221) which is placed on a front surface to mount the first smart device (110);
      a wired and wireless communicator (210) which performs wired and wireless communication with the first and second smart devices (110 and 310);
      an emotion expression unit (227) which expresses an emotion of the robot by generating an output signal of a form which is recognized by a user;
      a sensor (222) which senses movement of an external object or the user;
      a driver (232) which runs the robot main body; and
      a robot controller (235) which controls operation of the robot main body, provides the user with information on the emotion of the robot and enables the robot main body (200) to respond to an external stimulus or a motion of the user thereby enabling a communication between the user and the robot,
   wherein the controller (118 or 318) communicates with the user and provides the user with information of an emotional form by integrating and analyzing information provided by the sensor and information obtained from the first and second smart devices and generating an output signal of a form which is recognized by the user through the display (111 or 311) or the emotion, expression unit (227), and allows the robot main body (200) to move by controlling the driver (232) based on the analyzed information,
   wherein the robot main body (200) is selectably connected to the first or second smart device (110 or 310) in a wired or wireless manner, and when the robot main body (200) is wiredly connected to the first smart device (110) and wirelessly connected to the second smart device (310), the robot controller (235) simultaneously processes data received from the first and second smart devices (110 and 310) and controls operation of the robot main body according to the processing, and the wired and wireless communicator (210) determines whether a source of the transmitted and received data is wired or wireless, and
   wherein the robot controller (235) includes:
      a data processor (260) which analyzes data received through the wired and wireless communicator (210) or data to be transmitted through the wired and wireless communicator (210) and includes an input data processor (262) for processing the received data and an output data processor (264) for processing the data to be transmitted; and
      a robot service processor (270) which transmits a control signal for controlling operation of the robot main body according to a result of analyzing the data performed through the data processor (260).

2. The personal robot according to claim 1, wherein the robot controller (235) further includes an additional function extension unit (278) installed in a motherboard, in which the robot controller is implemented, to have a plug-in structure for extension of an additional function.

3. The personal robot according to claim 1, wherein an edge cover (241) is detachably combined at a circumferential edge of the smart device mount (221) of the robot main body (200).

4. The personal robot according to claim 1, wherein the emotion expression unit (227) includes:
   a speaker (228) for outputting a sound, a lamp (229) for generating light; and
   a motion unit (231) which moves a predetermined portion of the robot main body (200).

5. The personal robot according to claim 1, wherein the sensor (222) includes:
   an obstacle detecting sensor (225) installed on a front surface and a rear surface of the robot main body (200) to sense objects placed in front of and behind the robot main body (200);
   a fall prevention sensor (224) installed on a bottom surface of the robot main body (200) to sense an object placed under the robot main body (200); and
   a touch sensor (226) installed in the robot main body (200) to sense a predetermined stimulus.

6. The personal robot according to claim 1,
wherein the robot main body (200) further includes a beam project module (280) for performing a beam project function, and
wherein when a multimedia interface cable connected to the robot controller (235) is connected to a multimedia interface terminal formed in the first smart device (110), the robot main body (200) receives an image and a voice of the first smart device continuously through the multimedia interface cable and operates the beam project module (280).

* * * * *